W. C. NORCROSS.
ROCK-OVER MOLDING MACHINE.
APPLICATION FILED DEC. 22, 1919.
1,361,172.
Patented Dec. 7, 1920.
3 SHEETS—SHEET 3.
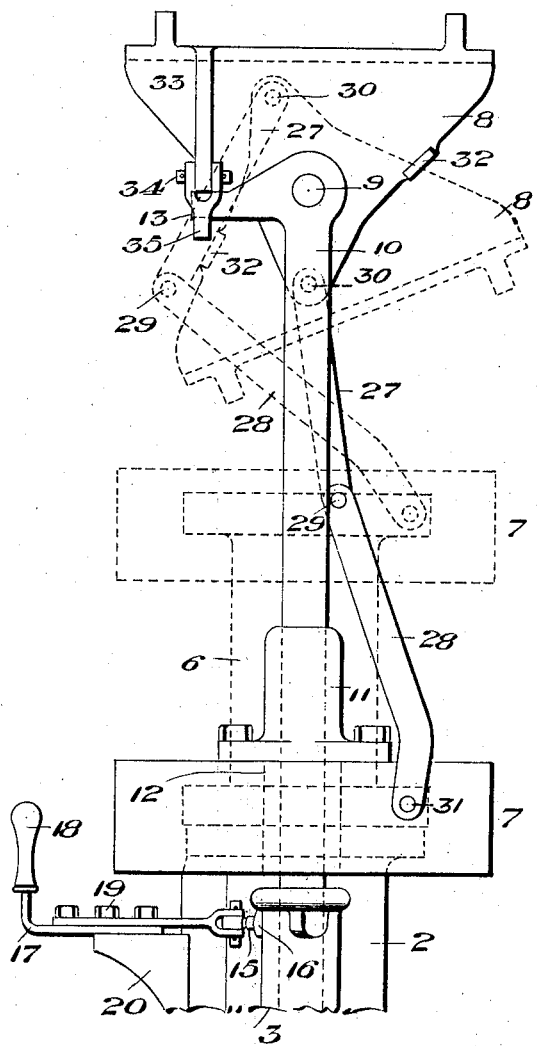
Fig. 3.
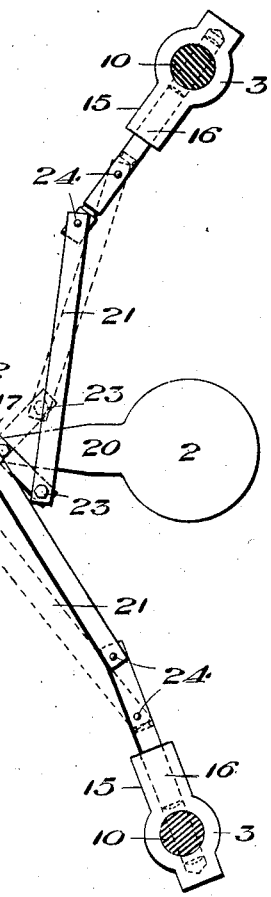
Fig. 4.

UNITED STATES PATENT OFFICE.

WILLIAM C. NORCROSS, OF TERRE HAUTE, INDIANA, ASSIGNOR TO AMERICAN MOLDING MACHINE COMPANY, OF TERRE HAUTE, INDIANA, A CORPORATION OF INDIANA.

ROCK-OVER MOLDING-MACHINE.

1,361,172.                  Specification of Letters Patent.        Patented Dec. 7, 1920.

Application filed December 22, 1919. Serial No. 346,526.

*To all whom it may concern:*

Be it known that I, WILLIAM C. NORCROSS, a citizen of the United States, residing at Terre Haute, in the county of Vigo and State of Indiana, have invented certain new and useful Improvements in Rock-Over Molding-Machines, of which the following is a specification.

This invention relates to that class of molding machines which comprises means for jolting the mold and for rocking it over and for drawing it from the pattern. The invention pertains to machines of this character wherein the mold support or rock-over table is adapted to be turned up-side-down above the jolting table, as distinguished from those rock-over molding machines wherein the mold platform or table is rocked over laterally to one side of the jolting table when the mold is to be drawn.

The invention has for its object the provision of a rock-over table and novel rock-over means whereby the table may be positioned on the jolting table for the purpose of jolting or ramming the mold or, run up by the jolting table, locked in elevated position, and rocked over by the descent of the jolting table and its piston to bring the mold in inverted position so that, thereafter, the jolting piston and table may be again run up to receive the flask and mold and then lowered away from the rock-over table to draw the flask and mold from the pattern.

In carrying out the foregoing object I provide guide posts to which the rock-over table is trunnioned or pivoted and which may be raised or lowered; also, locking means for securing the said guide posts in their raised positions to support them and the rock-over table so that the jolting table and piston may be lowered; further, novel means constituting an operative connection between the jolting table and rock-over table whereby the former is adapted to rock over the latter to carry out the purposes of the invention.

Additional features of my invention comprise locking or latching means of improved construction and action for the rock-over table; springs coöperating with the jolting table which are placed under tension when the jolting table is run up after the mold has been jolted and which serve as a counterbalance in the event the piston and jolting table are not heavy enough to rock over the mold and rock-over table for, it will be understood that the action of rocking over the rock-over table and the mold is caused by the descent of the piston and jolting table, and said action is only effected by gravity, being assisted by said springs, or counterweights, if desired.

My invention eliminates auxiliary cylinders and power means for effecting the rocking over of the rock-over table and mold. As I am aware that modifications may be resorted to in carrying out the essential principles of my present invention, the description and disclosure thereof are to be considered as illustrative and not restrictive of the scope of the invention.

In the accompanying drawings,

Fig. 3 is a side elevation, partly broken away, illustrating the action of the piston, jolting table and rock-over table in the act of rocking over the mold, and Fig. 4 is a detail plan view showing the locking means for the guide posts.

Figure 1:
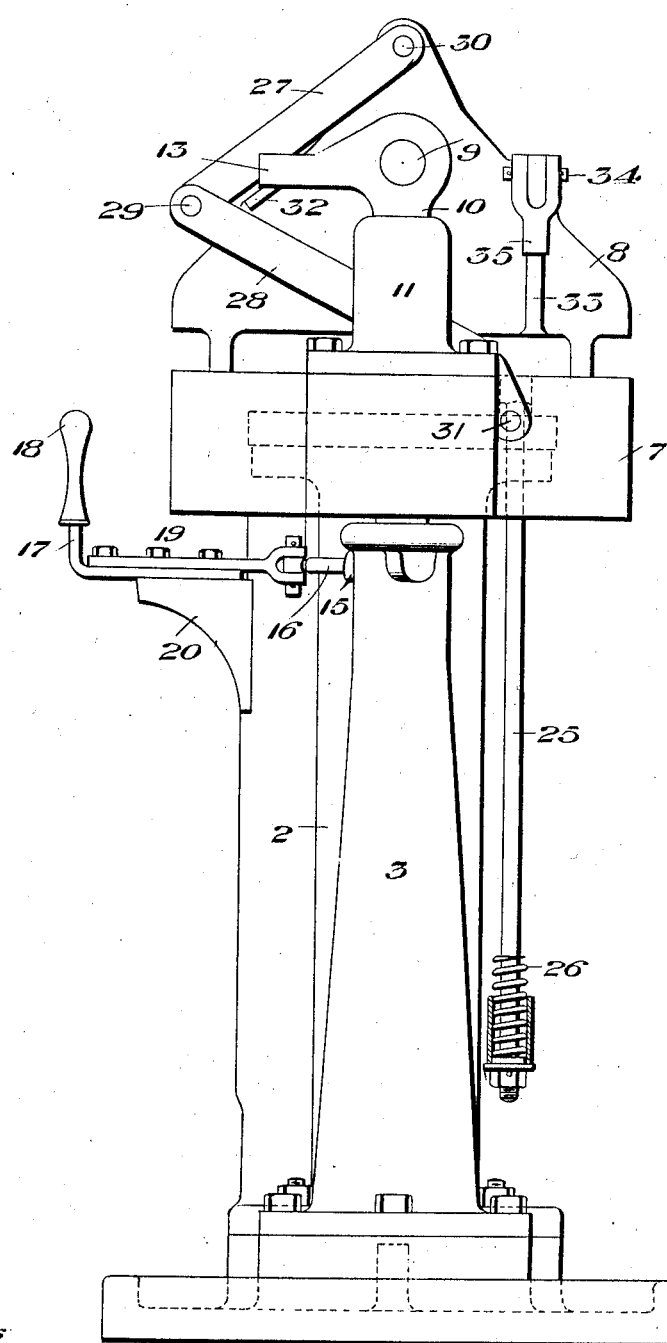
Figure 1 is a side elevation, the machine being in condition to jolt a mold.

The valves and other means whereby the piston is made to rapidly reciprocate in its cylinder or is enabled to be run up vertically in the cylinder to accomplish the rock-over action, are not shown, as a full understanding thereof may be had from my earlier patents on jolt-ramming machines; in fact, any desired, or preferred, controls may be employed and form no part of the present invention.

The machine has a base 1, a cylinder 2 surmounting the base, and hollow guides 3 also mounted on the base. The compressed air is admitted, under any suitable control, through a port 4 into cylinder 2 and exhausted therefrom through port 5. Suitable valve means coöperates with the piston to effect the rapid reciprocation thereof.

Figure 2:
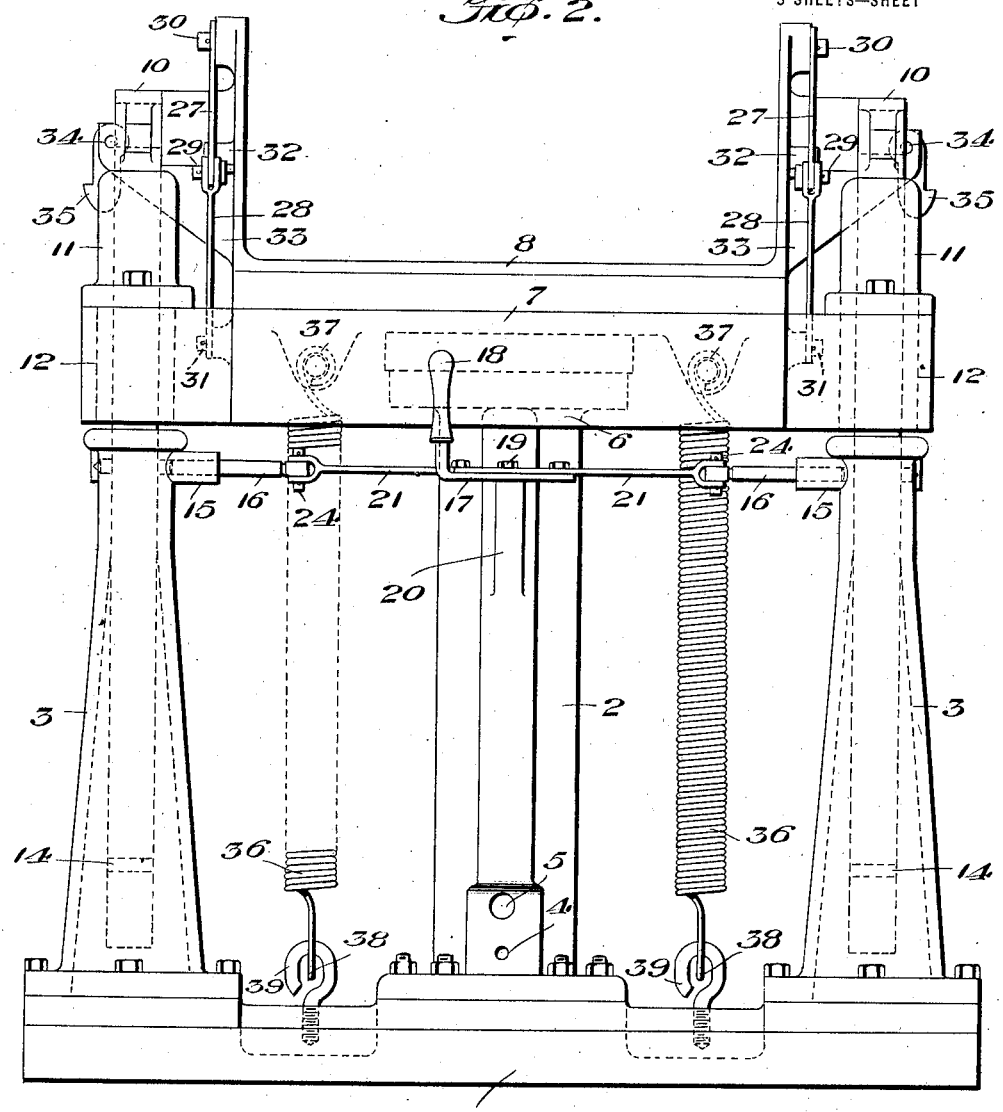
Fig. 2 is a front elevation thereof.

The piston which operates in the cylinder 2 appears at 6. The jolting table 7 is carried by the piston 6. The rock-over table 8 which normally rests upon the jolting table 7, as shown in Figs. 1 and 2, is adapted to hold the flask and mold which may be secured thereto in any manner. The rock-over table 8 is provided with trunnions 9 which are journaled in the upper ends of guide posts 10, the latter being loosely and freely slidable through pillars 11 bolted to the table 7 and loosely extending through the table at 12 and slidable up and down in the guides 3. While the fit between the guide posts 10 and the pillars 11 is a loose one, it is sufficiently snug so that these pillars will prevent any lost motion or lateral slip as between the tables 8 and 7. The upper ends of the guide posts 10 are provided with stops 13.

It will be seen from the foregoing construction that the rock-over table 8 may rest upon the jolting table 7 and move up and down with it, in a unitary fashion, or, the rock-over table 8 is capable of being supported independently of the jolting table 7. For the purpose of supporting the rock-over table 8 above the jolting table 7 so that the table 8 may be rocked over in a manner hereinafter described, I provide the locking means shown in Fig. 4. The guide posts 10 are provided at suitable points with transverse openings 14 which, when the tables 7 and 8 have been elevated to a suitable degree, come in alinement with hollow bosses 15 on the guides 3. When thus positioned, the locking means of Fig. 4 may be operated to project locking bolts 16 through the bosses 15 into the holes or openings 14, thereby locking the guide posts 10 so that they cannot fall and hence holding the rock-over table 8 in elevated position after the descent of the table 7 and piston 6. A lever 17 having handle 18 is mounted at 19 on a bracket 20 on cylinder 2. Articulated connections or linkages 21 connect at 22 and 23, respectively, with the lever 17 on opposite sides of its pivot 19 and are pivoted at 24 to the locking bolts 16. When the lever 17 is swung one way, the bolts are retracted, and when swung the other way, they are forced inwardly.

Depending from the table 7 is a limit or stop rod 25 which carries an adjustable spring cushion 26 at its lower end and passes loosely through the top flange of the cylinder 2. The spring cushion 26 is adapted to bear on the top flange of the cylinder when the tables 7 and 8 have been run up for the purpose of rocking over the table 8.

The operative connection between the tables 7 and 8 by which the latter is rocked or rolled over, comprises two pair of links each composed of sections 27 and 28 pivoted together at 29 and, respectively, pivoted to the table 8 at 30 and to the table 7 at 31. The rock-over table 8 has lugs, ears, or stops 32 which are positioned so that they are in the path of swing of the sections 27. There is, however, provided sufficient clearance between the edges of the links 27 and said lugs or stops 32 so that they will not engage until the table 7 has been lowered away a sufficient distance from the table 8 to enable the table 8 to swing without touching the table 7.

Projecting from the ends of the rock-over table 8 are webs 33 to which are pivoted at 34 the latches or hooks 35 which are adapted, when the table 8 is rocked over to the position shown by full lines in Fig. 3, to engage the stops 13 and lock the table 8 so that the face of the rock-over table, and hence of the mold, will be in substantial parallelism to the face of the jolting table 7.

To assist the weight of the platform 7 and piston 6 in accomplishing the rocking over of the table 8 when they descend, I have provided contractile springs 36 which are secured to the table 7 at 37 and have a normally loose connection at 38 with hooks 39 secured to the base 1. The looseness of the connection at 38 is sufficient to permit the normal amplitude of vibration of the piston 6 and table 7 with the rock-over table 8 superposed thereon when in the jolting condition shown in Fig. 1. When the piston is run up, however, to effect the rocking over of the table 8, the springs 36 are placed under tension which increases the higher the piston is elevated. The springs 36 assist in rocking the table 8 and the mold and flask over.

The trunnions 9 may be set slightly off center so that the rock-over table 8 will start to rock back without requiring its being pushed over the center of rotation by the operator.

The pillars 11, being removable from the table 7, may be taken off and replaced with substitutes when they become worn to such an extent as to allow any lateral movement of the guide posts 10 therein.

Operation: The flask and mold being supported by the rock-over table 8 when the machine is in the condition shown in Figs. 1 and 2, the usual jolting operation is carried on until the mold has been properly jolted or rammed. The exhaust valve is now closed and air admitted beneath the jolting piston 6. The piston 6 and tables 7 and 8 are raised by the air pressure until the cushion stop 26 engages the head of the cylinder 2. The holes 14 of the guide posts 10 having been brought into line with the locking bolts 16 by the elevation of the tables 7 and 8, the lever 17 is turned and the bolts 16 forced into the holes 14. The air is now slowly exhausted from beneath the jolting piston 6, allowing the piston and the table 7 to descend by gravity, assisted by the contraction of the springs 36. The table 8 being locked in its raised position, does not follow the table 7 in its descent. Immediately the table 7 has descended a sufficient distance allowed by the clearance existing between the lugs 32 and the sections 27 which will permit the table 8 to rock without striking the table 7, the sections 27 by their engagement with the lugs 32 start the table 8 to roll over. This action is illustrated by the dotted line showing in Fig. 3. The links 27, 28 eventually straighten out by the further descent of the piston and the direct pull exerted on the pivots 30 brings them to their lowermost position with the table 8 in completely inverted position as shown by full lines in Fig. 3. When this occurs, the latches 35 have passed the stops 13 and finally the heads of the latches fall under said stops and lock therewith, thus holding the rock-over table and the mold in substantial parallelism to the upper face of the jolting table 7.

The exhaust is again closed and air again admitted beneath the jolting piston 6, whereupon the said piston and the table 7 rise until the table 7 is up against the flask. The flask clamps are now removed. The air is again slowly exhausted from beneath the jolting piston and the latter allowed to descend, carrying the mold with it. The mold is then removed from the jolting table 7. Air is again admitted beneath the jolting piston and the table 7 run up, and the rock-over table pushed off its center and allowed to revolve back to normal position. The bolts 16 are then retracted by operating the lever 17. Air is then exhausted from beneath the piston 6 and the piston lowered with the rock-over table 8 superposed thereon until the parts assume the jolting position shown by Figs. 1 and 2.

What I claim is:

1. In a rock-over molding machine, the combination with a jolting support, of a rock-over mold support, adapted to be carried by the jolting support or to be sustained independently thereof, means whereby the rock-over mold support may be sustained independently of the jolting support, and means for rolling over the rock-over support by the movement of the jolting support in relation thereto.

2. In a rock-over molding machine, the combination with a jolting support, of a rock-over mold support, adapted to be carried by the jolting support or to be sustained independently thereof, means whereby the rock-over mold support may be sustained independently of the jolting support, and an operative connection between the jolting support and the rock-over mold support whereby the rock-over support may be rolled over by the movement of the jolting support in relation thereto.

3. In a rock-over molding machine, the combination with a jolting support, of a rock-over mold support, adapted to be carried by the jolting support or to be sustained independently thereof, means whereby the rock-over mold support may be sustained independently of the jolting support, and a linkage connecting the jolting support to the rock-over mold support, said rock-over support having a device for engagement by the linkage which is arranged to permit an initial relative movement of the jolting support prior to becoming active so that the rock-over support will be enabled to clear the jolting support when the rock-over support is rolled over by the movement of the jolting support.

4. In a rock-over molding machine, the combination with a jolting support, of a rock-over mold support, adapted to be carried by the jolting support or to be sustained independently thereof, means whereby the rock-over mold support may be sustained independently of the jolting support, means for rolling over the rock-over support by the movement of the jolting support in relation thereto, and means for locking the rock-over support when it is in rolled over position.

5. In a rock-over molding machine, the combination with a jolting support, of a rock-over mold support adapted to be carried by the jolting support or to be sustained independently thereof, slidably mounted guide posts to which the rock-over support is pivoted, means for locking the guide posts to hold them and the rock-over support in raised position, and means for rolling over the rock-over support by the movement of the jolting support in relation thereto.

6. In a rock-over molding machine, the combination with a jolting support, of a rock-over mold support, adapted to be carried by the jolting support or to be sustained independently thereof, slidably mounted guide posts to which the rock-over support is pivoted, guides in which said posts are adapted to slide, locking bolts for engaging the guide posts when the latter and the rock-over support are in raised position, a link and lever system for simultaneously operating said locking bolts, and means for rolling over the rock-over support by the movement of the jolting support in relation thereto.

7. In a rock-over molding machine, the combination with a jolting support, of a rock-over mold support, adapted to be carried by the jolting support or to be sustained independently thereof, means whereby the rock-over mold support may be sustained independently of the jolting support, and means for rolling over the rock-over support by the lowering movement of the jolting support after the rock over support has been sustained in raised position.

8. In a rock-over molding machine, the combination with a jolting support, of a rock-over mold support, adapted to be carried by the jolting support or to be sustained independently thereof, means whereby the rock-over mold support may be sustained independently of the jolting support, and an operative connection between the rock-over support and jolting support adapted to roll over the rock-over support by the lowering of the jolting support after the rock-over support has been sustained in raised position.

9. In a rock-over molding machine, the combination with a jolting support, of a rock-over mold support, adapted to be carried by the jolting support or to be sustained independently thereof, means whereby the rock-over mold support may be sustained independently of the jolting support, an operative connection between the rock-over support and jolting support adapted to roll over the rock-over support by the lowering of the jolting support after the rock over support has been sustained in raised position, and means, which becomes operative when the jolting support rises above jolting position, adapted to assist the jolting support in effecting the rolling over of the rock-over support when the jolting support is lowered after the rock-over support has been sustained in raised position.

In testimony whereof I affix my signature.

WILLIAM C. NORCROSS.